United States Patent [19]

Odell et al.

[11] Patent Number: 5,162,485
[45] Date of Patent: Nov. 10, 1992

[54] BISPHENOL BASED POLYESTERS USEFUL IN PHOTORECEPTOR MATRICES

[75] Inventors: Peter G. Odell; Dasarao K. Murti, both of Mississauga, Canada

[73] Assignee: Xerox Corporation, Stamford, Conn.

[21] Appl. No.: 626,849

[22] Filed: Dec. 13, 1990

[51] Int. Cl.$^5$ .................... C08G 63/00; C08G 63/02
[52] U.S. Cl. ................... 528/194; 528/176; 528/219
[58] Field of Search .............. 528/176, 194, 219

[56] References Cited

U.S. PATENT DOCUMENTS

| | | | |
|---|---|---|---|
| 3,398,120 | 8/1968 | Hindersinn et al. | 528/193 |
| 4,067,849 | 1/1978 | Chang | 528/194 |
| 4,171,421 | 10/1979 | Buxbaum | 528/194 |
| 4,265,990 | 5/1981 | Stolka et al. | 430/59 |
| 4,464,450 | 8/1984 | Teuscher | 430/59 |
| 4,584,253 | 4/1986 | Lin et al. | 430/59 |
| 4,585,884 | 4/1986 | Lin et al. | 556/413 |
| 4,766,255 | 8/1988 | Ong et al. | 568/728 |
| 4,925,760 | 5/1990 | Baranyi et al. | 430/59 |
| 4,927,903 | 5/1990 | Schreckenberg et al. | 528/176 |

*Primary Examiner*—John Kight, III
*Assistant Examiner*—T. Mosley
*Attorney, Agent, or Firm*—Kenyon & Kenyon

[57] ABSTRACT

Bisphenol-based polyesters and a process for their preparation having a first step of diacetylizing the bisphenol then polymerizing the diacetate with an aromatic diacid and an aliphatic diacid are disclosed. The bisphenol-based polyesters can be used as binder components in a charge transport or charge generation layers of an organic photoreceptor.

34 Claims, No Drawings

BISPHENOL BASED POLYESTERS USEFUL IN PHOTORECEPTOR MATRICES

BACKGROUND OF THE INVENTION

In electrophotography processes such as xerographic processes which utilize electrostatic images in the form of surface charge patterns, an electrostatic image charge pattern is first formed on the surface of a photosensitive member which consists of a photoconductive layer overlayered on a conductive substrate. The electrostatic latent image is usually made visible by the attraction of charged particles (toner) to the image surface. The toner particles are then transferred and fixed to an image receiving sheet, e.g., paper.

The photoconductive layer of the photosensitive member (or organic photoreceptor) may contain, as active layers, a charge generation layer and a charge transport layer. Layered photosensitive members are discussed in more detail in U.S. Pat. No. 4,265,990 to Stolka et al. which is incorporated herein in its entirety by reference. Additionally, U.S. Pat. No. 4,464,450, incorporated herein in its entirety by reference, discloses a layered imaging member including a blocking layer. U.S. Pat. No. 4,666,802 to Hung et al. which is totally incorporated herein by reference discloses photoconductive elements which contain multiple active layers, e.g. a charge generation layer and a charge transport layer. The Hung et al. charge generation layer also contains a phthalocyanine pigment. Other photoconductive and photogenerating pigments are known. U.S. Pat. Nos. 4,952,471, 4,922,018 and 4,925,760, all of which are incorporated herein in their entirety by reference disclose such pigments.

Polymer binders are usually preferable components of the charge generation layer and usually essential components of the charge transport layer of organic photoreceptors. Polymer binders were usually considered to be inactive. However, it has been found that the polymer binders in the charge generation layer have significant influence on the dispersion stability and photosensitivity of the generator pigment, and the polymer binders in the charge transport layer have a significant influence on the electrical and mechanical life of the photoreceptor.

Bisphenols have been used in the production of products (e.g., polycarbonates) used as binders for charge transport molecules, and photogenerating pigments used in layered photoconductive imaging members. In U.S. Pat. No. 4,766,255 to Ong et al., which is incorporated in its entirety herein by reference, there is disclosed a process for the preparation of bisphenols which are used in the preparation of polycarbonates. The bisphenols are generally prepared by the condensation of phenols with a carbonyl compound.

In the past, polycarbonates have usually been the binders used for charge transport in organic photoreceptors. Polycarbonate binders are discussed in more detail in U.S. patent application Ser. No. 546,821 by Odell, filed Jul. 2, 1990, which is incorporated herein, in its entirety by reference. Polycarbonates have also been synthesized by polyesterification of a bisphenol and a diarylcarbonate. However, there are several conditions and potential problems which must be considered in such a process. One problem is to control the viscosity below limits tolerable by the reactor system. During the polycondensation (second) stage of the reaction, the viscosity of the polymer melt increases quite rapidly. Increases in temperature are necessary to limit the increase in viscosity as the molecular weight of the polymer increases. The problems posed by high viscosity of a polycarbonate melt are difficult to deal with and include providing adequate mixing of the molten polymer to allow for both uniform heat distribution and uniform product quality. The removal of a very viscous polymer from the reactor is more complicated than simple stirring. The application of increased temperature to obtain a lower melt viscosity has only limited success, as temperatures of 300° C. and above result in a partial degradation of the polymer leading to a broader molecular weight distribution. This reduces the polymer's mechanical properties. Accordingly, there is a need for polymer resins that can be made with the advantages of melt polyesterification such as solventless polymerization and high purity product, without the disadvantages of extremely high melt viscosity and toxic byproducts.

The rate of increase in the molecular weight is controlled, at least in part, by the removal and condensation of the by-product, phenol. This control is facilitated if the phenol is kept in a liquid state, thus avoiding plugging and permitting easy measurement of the volume of removed phenol. However, under the lower pressure conditions existing in the second half of the polymerization, there is the increased possibility that the phenol will sublime and ultimately deposit in unwanted places. To avoid this, the phenol condensate must be kept cold. However, this interferes with the ability to accurately measure the volume of removed phenol, and hence makes it more difficult to control the molecular weight and to avoid plugging. In addition to these process difficulties, the phenol by-product is itself a toxin and requires special handling customary for toxic materials. The polycarbonate once produced must be purified of residual catalyst, as taught in U.S. Pat. No. 4,921,940, to produce a polymer that provides cyclic stability during xerographic processes.

The use of certain copolyesters as binder polymers in charge transport layers is also disclosed. U.S. Pat. No. 4,847,175 to Pavlisko et al. discloses the use of a norbornylidene bisphenol based polyester with crystallizable side chains. In Example 2, the norbornylidene bisphenol is copolymerized with terephthalate and azelate. The addition of a certain proportion of an essential ingredient ($\alpha\omega$-hydroxyl terminated poly(ethylene 2-n-octadecylsuccinate)) is also required in the reaction. Further, the copolyester polymer binder is prepared in solution, Thus, not only is the cost of preparation increased, but also solution preparation requires polymer isolation and purification as well as disposal of the solvents.

While imaging members with various charge transporting substances, especially hole transports, including the aryl amines disclosed in the prior art, such as U.S. Pat. Nos. 4,585,884 and 4,584,253 which are incorporated in their entirety herein by reference, are suitable for their intended purposes, there continues to be a need for improved imaging members, particularly layered members, with abrasion resistant resin binders. Another need resides in the provision of layered imaging members that are compatible with liquid developer compositions. Further, there continues to be a need for layered imaging members wherein the layers are sufficiently adhered to one another to allow the continuous use of such members in repetitive imaging systems. Also, there continues to be a need for improved layered imaging members comprised of hole transport layers wherein the problems of transport molecule crystallization, e.g., bleeding and leaching, are avoided or minimized. Furthermore, there is a need for imaging members with charge transport compounds or polymers dispersed in certain polyester resin binders that are soluble in nontoxic solvents, and wherein the resulting imaging members are inert to the users thereof. A further need resides in the provision of photoconductive imaging members with desirable mechanical characteristics.

There is therefore a need to provide a bisphenol-based polyester that may be used as a polymer binder in the charge transport layer of a photoreceptor that is synthesized more efficiently, has a lower melt viscosity and a less troublesome by-product than those polymers currently in use. Compatability with a molecular dispersion of a transport molecule such as N,N'-diphenyl-N,N'-bis(3-methylphenyl)-1,1'-diphenyl-4,4'-diamine does not require purification to provide a polymer with xerographic stability.

SUMMARY OF THE INVENTION

The invention described herein overcomes certain deficiencies described in connection with known polymers and processes previously described. The polymer of the present invention can be used in layered photoresponsive imaging members resulting in many of the advantages indicated herein. The polymer of the present invention may be used in layered photoconductive imaging members including use as binders for charge transport molecules. The members may have charge, especially hole transport layers in contact with a photogenerating layer, and are thus suitable for use with liquid and dry developers.

A layered photoresponsive imaging member of the present invention is not limited to a single configuration. For instance, the member has a photogenerating layer situated between a supporting substrate, and a hole transport layer with a polycarbonate resin binder Another configuration of the member of the present invention is a hole transporting layer situated between a supporting substrate and a photogenerating layer.

Further, improved layered imaging members are provided wherein the problems of transport molecule crystallization, hole charge transport molecule bleeding and leaching, and the like are eliminated or minimized, thus, enabling their selection, for example, in imaging apparatuses with liquid developer compositions in which members are insensitve to changes in environmental conditions.

The provided imaging members have charge, especially hole, transport layers that can be fabricated from solvents other than halogenated materials such as methylene chloride, and they may have charge transport layers that are free or substantially free of charge trapping. The imaging members are provided with electrical stability for an extended number of imaging cycles, for example, exceeding 200,000 in some instances. Moreover, the charge transport layers for imaging members can be prepared with nontoxic solvents. Furthermore, the imaging members of the present invention are provided with tensile strength, tensile toughness and elongation to break.

Imaging and printing methods with the layered imaging members are disclosed herein as is the provision of novel polyesters and processes thereof.

An embodiment of the present invention is the preparation and use of novel bisphenol-based polyesters which have utility as a binder in the charge transport layer They also can be used beneficially in the charge generation layer under conditions where their use leads to better dispersion stability and increased photosensitivity. The proper choice of catalyst and reaction route results in polyesters which can be prepared that are compatible with transport molecules, display xerographic cyclic stability as a transport matrix, and have a high degree of tensile toughness. One such transport molecule may be a diaryl amine transport molecule, N,N'-diphenyl-N,N'-bis-(3-methylphenyl)-1,1'-diphenyl-4,4'-diamine. Few polymers are compatible with the diaryl amine transport molecules. It is preferable to have at least a 30-40% compatibility of the polymer with the diaryl amines, otherwise the diaryl amines crystallizes and the photoreceptor loses functionality.

In copending applications U.S. Ser. No. 274,159, entitled PHOTOCONDUCTIVE IMAGING MEMBERS WITH N,N-BIS(BIARYLYL)ANILINE, OR TRIS(BIARYLYL)AMINE CHARGE TRANSPORTING COMPONENTS, and U.S. Ser. No. 274,160, entitled PHOTOCONDUCTIVE IMAGING MEMBERS WITH BIARYLYL DIARYLAMINE CHARGE TRANSPORTING COMPONENTS, the disclosures of which are totally incorporated herein by reference, there are described layered photoconductive imaging members with transport layers incorporating biarylyl diarylamines, N,N-bis(biarylyl)anilines, and tris(biarylyl)amines as charge transport compounds. In the above-mentioned applications, there are disclosed improved layered photoconductive imaging members comprised of a supporting substrate, a photogenerating layer optionally dispersed in an inactive resinous binder, and in contact therewith a charge transport layer comprised of the above-mentioned charge transport compounds, or mixtures thereof dispersed in resinous binders.

Examples of specific hole transporting components disclosed in application U.S. Ser. No. 274,159 include N,N-bis(4-biphenylyl)-3,5-dimethoxyaniline (Ia); N,N-bis(4-biphenylyl)-3,5-dimenthylaniline (Ib); N,N-bis(4-methyl-4'-biphenylyl)-3-methoxyaniline (Ic); N,N-bis(4-methyl-4'-biphenylyl)-3-chloroaniline (Id); N,N-bis(4-methyl-4'-biphenylyl)-4-ethylaniline (Ie); N,N-bis(4-chloro-4'-biphenylyl)-3-methylaniline (If); N,N-bis(4-bromo-4'-biphenylyl)-3,5-dimethoxy aniline (Ig); 4-biphenylyl bis(4-ethoxycarbonyl-4'-biphenylyl)amine (IIa); 4-biphenylyl bis(4-acetoxymethyl-4'-biphenylyl)amine (IIb); 3-biphenylyl bis(4-methyl-4'-biphenylyl)amine (IIc); 4-ethoxycarbonyl-4'-biphenylyl bis(4-methyl-4'-biphenylyl)amine (IId).

Examples of specific hole transporting compounds disclosed in application U.S. Ser. No. 274,160 includes bis(p-tolyl)-4-biphenylylamine (IIa); bis(p-chlorophenyl)-4-biphenylylamine (IIb); N-phenyl-N-(4-biphenylyl)p-toluidine (IIc); N-(4-biphenylyl)-N-(p-chlorophenyl)-p-toluidine (IId); N-phenyl-N-(4-biphenylyl)-p-anisidine (IIe); bis(m-anisyl)-4-biphenylylamine (IIIa); bis(m-tolyl)-4-biphenylylamine (IIIb); bis(m-chlorophenyl)-4-biphenylylamine (IIIc); N-phenyl-N-(4-biphenylyl)-m-toluidine (IIId); N-phenyl-N-(4-bromo-4'biphenylyl)-m-toluidine (IVa); diphenyl-4-methyl-4'-biphenylylamine (IVb); N-phenyl-N-(4-ethoxycarbonyl-4'-biphenylyl)-m-toluidine (IVc); N-phenyl-N-(4-methoxy-4'-biphenylyl)-m-toluidine (IVd); N-(m-anisyl)-N-(4-biphenylyl)-p-toluidine (IVe); bis(m-anisyl)-3-biphenylylamine (Va); N-phenyl-N-(4-methyl-3'-biphenylyl)-p-toluidine (Vb); N-phenyl-N-(4-methyl- 3′-biphenylyl)-m-anisidine (Vc); bis(m-anisyl)-3- -biphenylylamine (Vd); bis(p-tolyl)-4-methyl-3′-biphenylylamine (Ve); N-p-tolyl-N-(4-methoxy-3′-biphenylyl)-m-chloroaniline (Vf). The aforementioned charge components, especially hole transport components can be selected for the imaging members of the present invention in embodiments thereof.

The disclosed process has several advantages over known processes:

1. Acetic acid is less toxic and easier to condense than the phenol by-product of polycarbonate synthesis.

2. The melt viscosities encountered during polymerization are lower than for polycarbonates.

3. With the proper choice of catalysts for the diacetylization and polymerization, neither step requires purification to achieve reasonable cyclic stability during xerographic evaluation.

Exemplary compositions of the preferred bisphenol-based polyesters of the present invention are indicated as follows:

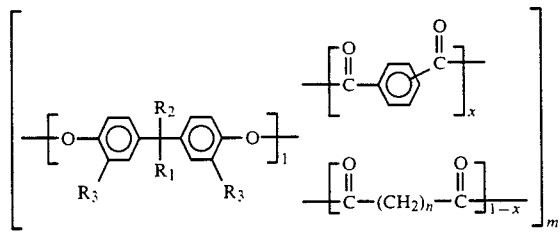

where m represents the degree of polymerization, n is a number from 1 to about 25, and x is a number less than or equal to one (preferably less than 1). $R_1$ and $R_2$ are independently selected from the group consisting of hydrogen, alkyl, aryl, substituted alkyl, and substituted aryl, wherein both alkyl and aryl groups can be substituted with fluoro, chloro and bromo groups; and aryl groups can be substituted with alkyl substituents such as methyl, ethyl, and propyl; alkyl groups could be branched (i.e., substituted with further alkyl groups) or have aryl substituents; the $R_1$—C—$R_2$ can be a sulfonyl group, a carbonyl, or oxygen; this central substituent need not be 1,4 or para to the oxygen but could be 1,3 or meta to the oxygen. Alkyl contains for example from 1 to about 25 atoms, and aryl with from 6 to about 24 carbon atoms, such as methyl, ethyl, phenyl, benzyl, napthyl, cyclohexyl, t-butylcyclohexyl, phenylcyclohexyl, and cycloheptyl. $R_3$ is alkyl, such as methyl, or hydrogen or halogen such as chlorine or bromine. $R_1$—C—$R_2$ can also be replaced by groups such as 1,3-phenylenebisisopropylidene or 1,4-phenylenebisisopropylidene. The aforementioned polymer preferably possesses a number average molecular weight of from about 7,000 to about 100,000, and a weight average molecular weight of from about 15,000 to about 300,000, and Mw/Mn ratio of from about 2.0 to about 4.0, as determined by a Waters Gel Permeation Chromatograph employing four Ultrastyragel ® columns with pore sizes of 100,500,500, $10^4$ Angstroms and using THF as solvent. It is understood that up to some maximum molecular weight, the polymer mechanical properties improve with increasing molecular weight. However, it is also believed that the coating technique chosen for photoreceptor fabrication can determine the choice of molecular weight in as much as dip coating usually requires lower molecular weight polymer than does spray coating which in turn usually requires a lower molecular weight than does drawn film coating.

The preferred ratio of bisphenol to the combination of diacids is about 1:1. Although other ratios of bisphenol to diacids can be employed in practicing the present invention, the use of an exact 1:1 ratio tends to promote higher levels of conversion and molecular weight and low levels of impurities. Higher levels of impurities in the polymer will require purification and can negatively impact on the quality of the polymer produced.

The synthesis of polyesters of the general structure shown above can be achieved by various polymerization methods. In all polymerizations methods, the polymerization is preceded by the diacetylization of the bisphenol. Any diacetylization catalyst known in the art may be used, however, pyridine or a similar amine is preferred. Appropriate polymerization methods and conditions are known in the art. Preferably the polymerization is performed by melt esterification at from about 200° to about 300° C. for 0–300 minutes at 5–1020 mbar. Most preferably the polymerization is performed in accordance with the temperature/time/pressure profile described in Example 1 below. Any known polymerization catalyst may be used depending on the desired reaction, however, magnesium metal and acetic anhydride are preferred.

Any bisphenol or mixture thereof which provides the desired characteristics may be employed in practicing the present invention, including but not limited to (4,4′-cyclohexylidenebisphenol), (4,4′-(1-phenylethylidene)-bisphenol), (4,4′-cyclohexylidene-2,2′-dimethylbisphenol), (4,4′-(4-t-butylcyclohexylidene)bisphenol), (4,4′-isopropylidenebisphenol), (4,4′-cycloheptylidenebisphenol), (4,4′-isopropylidene-2,2′-dimethylbisphenol), (4,4′-diphenylmethylidenebisphenol), (4,4′-(1,4-phenylenebisisopropylidene)bisphenol), (4,4′-(1,3-phenylenebisisopropylidene)bisphenol), (4,4′-cyclohexylidene-2,2′-dichlorobisphenol), (4,4′-(1,4-phenylenebisisopropylidene)bisphenol), which are named herein according to the conventions of the International Union of Pure and Applied Chemistry as found in Source-Based Nomenclature for Copolymers, Pure & Appl. Chem., Vol. 57, No. 10, pp. 1427–1440, 1985. Specific polyesters formed by the process of the present invention include poly[(4,4′-cyclohexylidenebisphenol)-alt-(terephthalic acid; sebacic acid)], poly[4,4′-cyclohexylidenebisphenol)-alt-terephthalic acid; azelaic acid)], poly[(4,4′-cyclohexylidenebisphenol)-alt-(terephthalic acid; suberic acid)], poly[(4,4′-cyclohexylidenebisphenol)-alt-(isophthalic acid; sebacic acid)], poly[(4,4′-cyclohexylidenebisphenol)-alt-(isophthalic acid; azelaic acid)], poly[(4,4′-(1-phenylethylidene)bisphenol)-alt-(isophthalic acid; suberic acid)], poly[(4,4′-(1-phenylethylidene)bisphenol)-alt-(terephthalic acid; sebacic acid)], poly[(4,4′-(1-phenylethylidene)bisphenol)-alt-(terephthalic acid; azelaic acid)], poly[(4,4′-(1-phenylethylidene)bisphenol)-alt-(terephthalic acid; suberic acid)], poly[(4,4′-(1-phenylethylidene)bisphenol)-alt-(isophthalic acid; sebacic acid)], poly[(4,4′-(1-phenylethylidene)bisphenol)-alt-(isophthalic acid; azelaic acid)], poly[(4,4′-(1-phenylethylidene)bisphenol)-alt-(isophthalic acid; suberic acid)], poly[(4,4′-cyclohexylidene-2,2′-dimethylbisphenol)-alt-(terephthalic acid; sebacic acid)], poly[(4,4′-cyclohexylidene-2,2′-dimethylbisphenol)-alt-(terephthalic acid; azelaic acid)]poly[(4,4′-cyclohexylidene-2,2′-dimethylbisphenol)-alt-(terephthalic acid; suberic acid)], poly[(4,4′-cyclohexylidene-2,2′-dimethylbisphenol)-alt-(isophthalic acid; sebacic acid)], poly[(4,4'-cyclohexylidene-2,2'-dimethylbisphenol)-alt-isophthalic acid; azelaic acid)], poly[(4,4'-(4-t-butylcyclohexylidene)bisphenol)-alt-(terephthalic acid; sebacic acid)], poly[(4,4'(4-t-butylcyclohexylidene)bisphenol)-alt-(terephthalic acid; azelaic acid)], poly[(4,4'-(4-t-butylcyclohexylidene)bisphenol)-alt-(terephthalic acid; suberic acid)], poly[(4,4'-(4-t -butylcyclohexylidene)bisphenol)-alt-(isophthalic acid; sebacic acid)], poly[(4,4'-(4-t-butylcyclohexylidene)bisphenol)-alt -(isophthalic acid; azelaic acid)], poly[(4,4'-isopropylidenebisphenol)-alt-(terephthalic acid; sebacic acid)], poly[(4,4'-isopropylidenebisphenol)-alt-(terephthalic acid; azelaic acid)], poly[(4,4'-isopropylidenebisphenol)-alt-(terephthalic acid; suberic acid)], poly[(4,4'-isopropylidenebisphenol)-alt-(isophthalic acid; sebacic acid)], poly[(4,4'-isopropylidenebisphenol)-alt-(isophthalic acid; azelaic acid)], poly[4,4'-cycloheptylidenebisphenol) -alt-(terephthalic acid; sebacic acid)], poly[4,4'-cycloheptylidenebisphenol)-alt-(terephthalic acid; azelaic acid)], poly[4,4'-cycloheptylidenebisphenol)-alt-(terephthalic acid; suberic acid)], poly[(4,4'-cycloheptylidenebisphenol) -alt-(isophthalic acid; sebacic acid)], poly[(4,4'-cycloheptylidenebisphenol)-alt-(isophthalic acid; azelaic acid)], poly[(4,4'-isopropylidene-2,2'-dimethylbisphenol)-alt-terephthalic acid; sebacic acid)], poly[(4,4'-isopropylidene -2,2'-dimethylbisphenol)-alt-terephthalic acid; azelaic acid)], poly[(4,4'-isopropylidene-2,2'-dimethylbisphenol)-alt-terephthalic acid; suberic acid)], poly[(4,4'-isopropylidene-2,2'-dimethylbisphenol)-alt(isophthalic acid; sebacic acid)], poly[(4,4'-isopropylidene-2,2'-dimethylbisphenol)alt-(isophthalic acid; azelaic acid)], poly[(4,4'-dipehnylmethylidenebisphenol)-alt-(terephthalic acid; sebacic acid)], poly[(4,4'-diphenylmethylidenebisphenol)-alt-(terephthalic acid; azelaic acid)], poly[(4,4'-diphenylmethylidenebisphenol)-alt-(terephthalic acid; suberic acid)], poly[(4,4'-diphenylmethylidenebisphenol)-alt-(isophthalic acid; sebacic acid)], poly[(4,4'-diphenylmethylidenebisphenol)-alt-(isophthalic acid; azelaic acid)], poly[(4,4'-(1,4-phenylenebisisopropylidene)bisphenol) -alt-(terephthalic acid; sebacic acid)], poly[(4,4'-(1,4-phenylenebisisopropylidene)bisphenol)-alt-(terephthalic acid; azelaic acid)], poly[(4,4'-(1,4-phenylenebisisopropylidene)bisphenol)-alt-(terephthalic acid; suberic acid)], poly[(4,4'-(1,4-phenylenebisisopropylidene)bisphenol)-alt-(isophthalic acid; sebacic acid)], poly[(4,4'-(1,4-phenylenebisisopropylidene)bisphenol)-alt-(isophthalic acid; azelaic acid)], poly[(4,4'-(1,3-phenylenebisisopropylidene)bisphenol)-alt-(terephthalic acid; sebacic acid)], poly[(4,4'-(1,3-phenylenebisisopropylidene)bisphenol)-alt-(terephthalic acid; azelaic acid)], poly[(4,4'-(1,3-phenylenebisisopropylidene)bisphenol)-alt-(terephthalic acid; suberic acid)], poly[(4,4'-(1,3-phenylenebisisopropylidene)bisphenol)-alt-(isophthalic acid; sebacic acid)], poly[(4,4'-(1,3-phenylenebisisopropylidene)bisphenol)-alt-(isophthalic acid; azelaic acid)], poly[(4,4'-cyclohexylidene-2,2'-dichlorobisphenol)-alt-(terephthalic acid; sebacic acid)], poly[(4,4'-cyclohexylidene-2,2'-dichlorobisphenol)-alt-(terephthalic acid; azelaic acid)], poly[(4,4'-cyclohexylidene-2,2'-dichlorobisphenol)-alt-(terephthalic acid; suberic acid)], poly[(4,4'-cyclohexylidene-2,2'-dichlorobisphenol)-alt-(isophthalic acid; sebacic acid)], poly[(4,4'-cyclohexylidene-2,2'-dichlorobisphenol)-alt-(isophthalic acid; azelaic acid)], poly[(4,4'-cyclohexylidene-2,2'-dichlorobisphenol)-alt-(terephthalic acid; glutaric acid)], poly[(4,4'-(1,4-phenylenebisisopropylidene)bisphenol) -alt-(terephthalic acid; azelaic acid)], poly[(4,4'-isopropylidenebisphenol)-alt-(isophthalic acid; adipic acid)], poly[(4,4'-cyclohexylidene-2,2'-dimethylbisphenol)-alt-(terephthalic acid; pimelic acid)], poly[(4,4'-cyclohexylidenebisphenol)-alt-(terephthalic acid; brassylic acid)], poly[(4,4'-cyclohexylidene-2,2'-dichlorobisphenol)-alt-(terephthalic acid; malonic acid)], poly[(4,4'-(1,4-phenylenebisisopropylidene)bisphenol)-alt-(terephthalic acid; 1,4-cyclohexanedicarboxylic acid)], poly[(4,4'-isopropylidenebisphenol)-alt-(isophthalic acid; 3,3-dimethylglutaric acid)], poly[(4,4'-cyclohexylidene-2,2'-dimethylbisphenol)-alt-(terephthalic acid; succinic acid)], poly[(4,4'-cyclohexylidenebisphenol)-alt-(terephthalic acid; 2,3-dibromosuccinic acid)].

Other examples include polyesters made from more than one aryl diacid such as poly[(4,4'-cyclohexylidenebisphenol)-alt-(terephthalic acid; isophthalic acid; sebacic acid)], poly[(4,4'-cyclohexylidenebisphenol)-alt-(terephthalic acid; isophthalic acid; azelaic acid)], poly[(4,4'-cyclohexylidenebisphenol)-alt-(terephthalic acid; isophthalic acid; suberic acid)]. Alternatively, and additionally, more than one aliphatic diacid can be employed such as poly[(4,4'-cyclohexylidenebisphenol)-alt-(terephthalic acid; azelaic acid; sebacic acid)], poly[(4,4'-cyclohexylidenebisphenol)-alt-(terephthalic acid; succinic acid; glutaric acid)], poly[(4,4'-cyclohexylidenebisphenol)-alt-(terephthalic acid; 1,4-cyclohexanedicarboxylic acid; suberic acid)]. Additional examples include polymers containing more than one bisphenol structure such as poly[(4,4'-cyclohexylidene-2,2'-dichlorobisphenol; 4,4'-isopropylidenebisphenol)-alt-(terephthalic acid; sebacic acid), poly[(4,4'-cyclohexylidenebisphenol; 4,4'-cyclohexylidene-2,2'-dimethylbisphenol)-alt-(terephthalic acid; sebacic acid), poly[(4,4'-isopropylidene-2,2'-dimethylbisphenol; 4,4'-cyclohexylidene-2,2'-dimethylbisphenol)-alt-(terephthalic acid; sebacic acid), poly[(4,4'-cyclohexylidenebisphenol; 4,4'-(1,4-phenylenebisisopropylidene)bisphenol)-alt-(terephthalic acid; sebacic acid).

The choices of the aromatic diacid and aliphatic diacids are also not limited to terephthalic acid and sebacic, azelaic or suberic acid, respectively. Any aromatic diacid or aliphatic diacid can be used. Although terephthalic acid is most preferred, other appropriate aromatic diacids include isophthalic acid and phthalic acid. Although sebacic, azelaic and suberic acids are preferred (most preferably, sebacic acid), other preferable aliphatic diacids include those having 2-9 carbons, most preferably 4-9 carbons. Although any aliphatic diacid can be used, when the number of carbon atoms is less than 4, the $T_g$ decreases, and when the number of carbon atoms is greater than 9, the cost of production increases. The aromatic diacid and aliphatic diacid should be chosen to provide the desired characteristics in the final polymer. The relative proportion of the diacids can range from 99:1 to 1:99, aromatic to aliphatic. Particularly appropriate ratios are 60:40 to 40:60.

The choice of bisphenol(s), aromatic diacid and aliphatic diacid will vary with the photoreceptor design. It is believed that the bisphenol and aromatic diacid are mostly responsible for the toughness of the polymer, its m-TBD compatibility, and the relatively high glass transition temperature ($T_g$). These components may also raise the mobility of the photoreceptor transport layer. The aliphatic portion of the polymer is believed to increase polymer solubility in the organic coating solvents and ma increase the elasticity of the polymer.

Examples of specific hole transporting molecules in addition to the aryl amines disclosed herein include, but are not limited to, those molecules of the following formulas wherein X is independently selected from halogen or alkyl, and preferably N,N'-diphenyl-N,N'-bis(3-methylphenyl)-(1,1'-biphenyl)-4,4'-diamine.

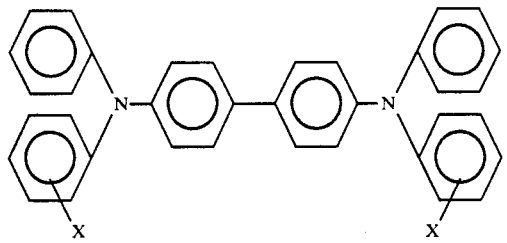

The photoresponsive imaging members of the present invention can be prepared by a number of known methods, the process parameters and the order of the coating of the layers being dependent on the member desired. Thus, for example, the photoresponsive members of the present invention can be prepared by providing a conductive substrate with an optional charge blocking layer and an optional adhesive layer, and applying thereto a photogenerating layer, and overcoating thereon a charge transport layer dispersed in the polyester resinous binder illustrated herein. The photoresponsive imaging members of the present invention can be fabricated by commonly known coating techniques such as by dip coating, draw-bar coating, or by spray coating process, depending mainly on the type of imaging devices desired. Each coating, however, can be usually dried, for example, in a convection or forced air oven at a suitable temperature before a subsequent layer is applied thereto. In one embodiment of the present invention, the transport layer can be fabricated from a 10 weight percent solution of the charge transporting molecules, which molecules are usually present in an amount of from about 35 to about 60 weight percent, and preferably 40 weight percent, and are dispersed in the polyester resinous binder illustrated herein, preferably in an amount of 60 weight percent. The aforementioned solution can be obtained by stirring 6 grams of the selected polyester and 4 grams of the charge transport molecule in 100 milliliters of methylene chloride at ambient temperature. The resulting solution can then be draw bar coated on the photogenerating layer and thereafter dried. The drying temperature is dependent on a number of factors including the components selected, particularly the photogenerating component, but generally drying is accomplished at about 130° C., especially in situations wherein trigonal selenium is selected as the photogenerating pigment dispersed in a polyvinyl carbazole binder.

In an illustrative embodiment, the photoconductive imaging member of the present invention is comprised of (1) a conductive supporting substrate of Mylar ® with a thickness of 75 microns and a conductive vacuum deposited layer of titanium with a thickness of 0.02 microns, (2) a hole blocking layer of N-methyl-3-aminopropyltrimethoxysilane with a thickness of 0.1 micron, (3) an adhesive layer of 49,000 Polyester (obtained from E.I. DuPont Chemical) with a thickness of 0.05 microns, (4) a photogeneration layer of a dispersion of trigonal selenium with a thickness of 1 micron and (5) a charge transport layer with a thickness of 20 microns of an aryl amine dispersed in a resin binder of a bisphenol based polyester.

DETAILED DESCRIPTION

The following examples further illustrate the invention and comparative dates is also presented.

EXAMPLE 1

Diacetate preparation: Acetic anhydride (800 ml), pyridine (270 ml) and 4,4'-cyclohexylidenebisphenol (Bisphenol Z) (270 g) were added to a three liter round bottom flask which was equipped with thermometer, mechanical stirrer, and a condenser with a drying tube. The mixture was heated by an oil bath. The mixture was refluxed for about four hours and then poured into ice water. The product, 4,4'-cyclohexylidenebisphenol diacetate, was collected by filtration and dried in a vacuum oven. Yield 88%.

Then, the mixture of:

| Bisphenol Z diacetate (obtained above) | 300.4 g |
| --- | --- |
| Terephthalic acid | 70.8 g |
| Sebacic acid | 86.2 g |
| Magnesium metal | 0.13 g | was added to a polymerization reactor. The polymerization reactor employed was a 1 liter stainless steel reactor equipped with a helical coil stirrer and a double mechanical seal. It was driven by 0.5 hp motor with a 30:1 gear reduction. A torque meter was part of the stirrer drive. The reactor was heated electrically. The pressure was monitored by both pressure transducer and pirani gauge. The temperature was monitored by platinum resistive temperature sensing devices (RTD's). The pressure and temperature were precisely controlled and profiled by a Fisher and Porter Chameleon controller. A condenser ensured the efficient condensation of acetic acid. A series of valves and a rotary oil pump provided controlled variations in reactor pressure.

The reactor was sealed and the temperature raised to about 250° C. This temperature was maintained for 120 minutes. An hour into the polymerization the pressure was lowered to about 700 mbar in the space of 10-15 minutes. This pressure was maintained for about 60 minutes. The temperature was then raised to 270° C. and maintained there for about 245 minutes. About two hours into the reaction the pressure was decreased at such a rate that about 90 minutes was required to reach about 5 mbar. Following the 270° C. wait, the temperature was raised and held at 280° C. for about 120 minutes and then to 300° C. for a further 100 minutes. The molten polymer poly[(4,4'-cyclohexylidenebisphenol)-alt-(terephthalic acid; sebasic acid)] was then drawn out of the reactor and into a dry nitrogen atmosphere to cool.

EXAMPLE 2

The procedure of Example 1 was repeated except that the diacetate was prepared using 4.9 ml of sulfuric acid in place of pyridine.

EXAMPLE 3

The procedure of Example 1 was repeated except 4,4'-(1-phenylethylidene)bisphenol diacetate was prepared instead of the 4,4'-cyclohexylidenebisphenol.

Then the following monomers were mixed and polymerized according to the procedure of Example 1.

| | |
|---|---|
| 4,4'-(1-phenylethylidene) bisphenol (bisphenol AP) diacetate | 366 g |
| Terephalic acid | 81.2 g |
| Sebacic acid | 98.9 g |
| Magnesium metal powder | 0.13 g |

Poly[4,4'-(1-phenylethylidene)-alt-(terephthalic acid; sebacic acid)] was formed.

EXAMPLE 4

A photoresponsive imaging member comprised of a polyester of Example 1 as the resinous binder in the hole transport layer and vanadyl phthalocyanine as the photogenerator was prepared as follows:

A titanized Mylar ® substrate with a thickness of about 75 microns comprised of Mylar ® with a thickness of 75 microns and titanium film with a thickness of 0.02 microns was obtained from Martin Processing Inc. The titanium film was coated with a solution of 1 milliliters of 3-aminopropyltrimethoxysilane in 100 milliliters of ethanol. The coating was heated at 110° C. for 10 minutes, resulting in the formation of a 0.1 micron thick polysilane layer. The polysilane layer is a hole blocking layer and prevents the injection of holes from the titanium film and blocks the flow of holes into the charge generation layer. The polysilane layer is used to obtain the desired initial surface charge potential of about $-800$ volts for this imaging member. A dispersion of a photogenerator prepared by ball milling a mixture of 0.07 gram of vanadyl phthalocyanine and 0.13 gram of Vitel PE-200 polyester (Goodyear) in 12 millimeters of methylene chloride for 24 hours was coated by means of a Bird film applicator on top of the polysilane layer. After drying the coating in a forced air oven at 135° C. for 10 minutes, a 0.5 micron thick vanadyl phthalocyanine photogenerating layer with 35 percent by weight of vanadyl phthalocyanine and 65 percent by weight of polyester was obtained.

A solution for the charge transport layer of imaging member 1 (control) was then prepared by dissolving 1.0 grams of N,N'-diphenyl-N,N'bis(3-methylphenyl)-[1,1'-biphenyl]-4,4'-diamine, 1.0 grams of polycarbonate Z in 10 milliliters of methylene chloride. This solution was then coated over the photogenerator layer by means of a Bird film applicator. The resulting layered photoconductive imaging member 1 was then dried in a forced air oven at 135° C. for 20 minutes, resulting in a 20 micron thick charge transport layer.

A solution for the charge transport layer of imaging member 2 was then prepared by dissolving 1.0 grams of N,N'-diphenyl-N,N'bis(3-methylphenyl)-[1,1'-biphenyl]-4,4'-diamine, 1.0 grams of polyester of Example 1 in 10 milliliters of methylene chloride. This solution was then coated over the photogenerator layer by means of a Bird film applicator. The resulting layered photoconductive imaging member 2 was then dried in a forced air oven at 135° C. for 20 minutes, resulting in a 20 micron thick charge transport layer.

The xerographic electrical properties of the aforementioned imaging members were then determined by electrostatically charging the surfaces thereof with a corona discharge source until the surface potentials, as measured by a capacitively coupled probe attached to an electrometer, attained an initial value $V_o$ of about $-800$ volts. After resting for 0.5 seconds in the dark, the charge members reached a surface potential of $V_{ddp}$, dark development potential, and each member was then exposed to light from a filtered Xenon lamp with a XBO 150 watt bulb. A reduction in surface potential to a $V_{bg}$ value, background potential, due to photodischarge effect was observed. The background potential was reduced by exposing with a light intensity about 10 times greater than the expose energy. The resulting potential on the imaging member was designated as the residual potential, Vr. The dark decay in volt/second was calculated as $(V_o - V_{ddp})/0.5$. The percent of photodischarge was calculated as 100 percent $(V_{ddp} - V_{bg})/V_{ddp}$. The desired wavelength and energy of the expose light was determined by the type of filters placed in front of the lamp. The broad band white light (400 to 700 nanometers) photosensitivity of these imaging members were measured by using an infrared cut-off filter whereas the monochromatic light photosensitivity was determined using narrow band-pass filter.

The photosensitivity of the imaging members is usually provided in terms of the amount of expose energy in erg/cm$^2$, designated as $E_{\frac{1}{2}}$, required to achieve 50 percent of photodischarge from the dark development potential. The higher the photosensitivity, the smaller is the $E_{\frac{1}{2}}$ value. The devices were subjected to 1000 cycles of repeated charging, discharging and erase to determine the cycling stability. The results are shown in Table 1. Changes in $V_{ddp}$, $V_{bg}$, $V_{res}$ are indicated as $\Delta V_{ddp}$, $\Delta V_{bg}$, $\Delta V_{res}$. The results indicate excellent cycling stability.

TABLE 1

| | Xerographic Cycling Data | |
|---|---|---|
| Xeroxgraphic Parameters | Imaging Member 1 (Control) PC(Z) | Imaging Member 2 Polyester - Example 1 |
| Vddp(V) | −800 | −800 |
| Dark Decay (V/s) | 32 | 35 |
| E½ (ergs/cm²) | 8.5 | 8.4 |
| Cycling Data | | |
| Number of cycle | 1000 | 1000 |
| Δ Vddp(V) | −40 | −42 |
| Δ Vbg(V) | 10 | 12 |
| Δ Vres(V) | 10 | 10 |
| Vres(V) | 25 | 20 |

EXAMPLE 5

A layered photoresponsive imaging member comprised of N,N'-diphenyl-N,N'-bis(3-methylphenyl)-(1,1'-diphenyl)-4,4'-diamine molecularly dispersed in a polyester of Example 2 as the hole transport layer, and a squarylium pigment generator layer was fabricated as follows:

An aluminized Mylar ® substrate was coated with a solution of 1 millileter of 3-aminopropyltrimethoxysilane in 100 milliliters of ethanol. The coating was heated at 110° C. for 10 minutes, resulting in the formation of a 0.1 micron thick polysilane layer. A dispersion for the photogenerator layer was prepared by ball milling a mixture of 0.07 grams of bis(N,N'-dimethylaminophenyl)-squaraine and 0.13 grams of the polyester of Example 2 in 12 milliliters of methylene chloride for 24 hours was then coated by means of a Bird film applicator on top of the polysilane layer. After drying the coating in a forced air oven at 135° C. for 6 minutes, a 0.5 micron thick layer with 35 percent by weight of squaraine and 65 percent by weight of polyester was obtained. A solution for the hole transport layer was then prepared by dissolving 0.7 grams of N,N'-diphenyl-N,N'bis(3-methylphenyl)-[1,1'-biphenyl]-4,4'-diamine, 1.3 grams of the polyester of Example 2 in 10 milliliters of methylene chloride. This solution was then coated over the photogenerator layer by means of a Bird film applicator. The resulting member was then dried in a forced air oven at 135° C. for 20 minutes, resulting in a 20 micron thick charge transport layer.

The fabricated imaging member was tested electrically in accordance with the procedure of Example 4. Specifically, this imaging member was negatively charged to 800 V and discharged when exposed to monochromatic light of a wavelength of 830 nanometers. The half decay exposure sensitivity for this device was 8 ergs/cm$^2$ and the residual potential was 15 V. The electrical properties of this imaging member remained essentially unchanged after 1,000 cycles of repeated charging an discharging.

EXAMPLE 6

A layered photoresponsive imaging member comprised of N,N'-diphenyl-N,N'bis(3-methylphenyl)-[1,1'-biphenyl]-4,4'-diamine molecularly dispersed in a polyester of Example 2 as the hole transport layer, and an amorphous selenium generator layer was fabricated as follows:

A 0.5 micron thick layer of amorphous selenium on an aluminum plate of a thickness of 7 mils was prepared by vacuum deposition techniques. Vacuum deposition was accomplished in a Varian 3117 vacuum system at a pressure of 10$^{-6}$ torr, while the substrate was maintained at 50° C. A solution for the hole transport layer was then prepared by dissolving 0.8 grams of N,N'-diphenyl-N,N'bis(3-methylphenyl)-[1,1'-biphenyl]-4,4'-diamine, 1.2 grams of the polyester in 10 milliliters of methylene chloride. This solution was then coated over the photogenerator layer by means of a Bird film applicator. The resulting member was then dried in a forced air oven at 135° C. for 20 minutes, resulting in a 20 micron thick hole transport layer.

The fabricated imaging member was tested electrically in accordance with the procedure of Example 4. Specifically, this imaging member was negatively charged to 800 V and discharged when exposed to monochromatic light of a wavelength of 430 nanometers. The half decay exposure sensitivity for this device was 2.0 ergs/cm$^2$ and the residual potential was 20 V. The electrical properties of this imaging member remained essentially unchanged after 1000 cycles of repeated charging and discharging.

EXAMPLE 7

A layered photoresponsive imaging member comprised of N,N'-diphenyl-N,N'bis(3-methylphenyl)-[1,1'-biphenyl]-4,4'-diamine molecularly dispersed in a polyester of Example 1 as the hole transport layer, and a trigonal selenium generator layer was fabricated as follows:

A dispersion of trigonal selenium and poly(N-vinyl carbazole) was prepared by ball milling 1.6 grams of trigonal selenium and 1.6 grams of poly(N-vinyl carbazole) in 14 milliliters each of tetrahydrofuran and toluene. Ten grams of the resulting slurry was then diluted with a solution of 0.24 grams of N,N'-diphenyl-N,N'bis(3-methylphenyl)-[1,1'-biphenyl]-4,4'-diamine in 5 milliliters each of tetrahydrofuran and toluene. A 1.5 micron thick photogenerator layer was fabricated by coating the above dispersion onto an aluminized Mylar ® substrate, thickness of 75 microns, with a Bird film applicator, followed by drying in a forced air oven at 135° C. for 5 minutes. A solution for the charge transport layer was then prepared by dissolving 1.0 grams of N,N'-diphenyl-N,N'bis(3-methylphenyl)-[1,1'-biphenyl]-4,4'-diamine, 1.0 grams of the polyester of Example 1 in 10 milliliters of methylene chloride. This solution was then coated over the photogenerator layer by means of a Bird film applicator. The resulting member was then dried in a forced air oven at 135° C. for 20 minutes, resulting in a 20 micron thick charge transport layer.

The fabricated imaging member was tested electrically in accordance with the procedure of Example 4. Specifically, this imaging member was negatively charged to 800 V and discharged when exposed to white light of wavelengths of 400 to 700 nanometers. The half decay exposure sensitivity for this device was 2.4 ergs/cm$^2$ and the residual potential was 25 V. The electrical properties of this imaging member did not change after 1,000 cycles of repeated charging and discharging.

EXAMPLE 8

A layered photoresponsive imaging member was fabricated as described in Example 7. The fabricated imaging member was tested electrically using an electrode scanner. This was used to determine the electrical properties of the imaging member subjected to 50,000 cycles. The procedure is similar to that described in Example 4. An electrode scanner does not use a corona to charge the surface of the imaging member, instead a high voltage power supply is used to maintain the surface voltage of the imaging member at −800 V. As indicated in Example 4, $V_{ddp}$, $V_{bg}$ and $V_{res}$ are measured before and after the cycling test. The results are indicated on Table 2 and show that the imaging member has excellent cycling stability.

TABLE 2

| Extended cycling data - cycling test of 50,000 cycles | |
|---|---|
| Xerographic parameter | Imaging member Polyester of Example 1 |
| Surface voltage (V) | −800 |
| Dark discharge voltage Vddp(V) | −700 |
| Cycling Data | |
| Number of cycles | 50,000 |
| Δ Vddp(V) | −70 |
| Δ Vbg(V) | 18 |
| Δ Vres(V) | 12 |
| Vres(V) | 12 |

EXAMPLE 9

The polyesters of Examples 1 and 2 and a polycarbonate Z comparative polymer obtained from Mitsubishi Chemical were tested as follows: three photoresponsive imaging members containing the hole transport molecule, N,N'-diphenyl-N,N'bis(3-methylphenyl)-[1,1'-biphenyl]-4,4'-diamine, in the above polymer binders respectively as the charge transport layer and trigonal selenium as the photogenerator layer were prepared according to the procedure described in Example 7. Mechanical testing was done with samples of the above prepared imaging members with a sample size of 5 centimeters in length and with a width of 1.5 centimeters. Tensile tests were then conducted on an Instron materials testing system (Model number 1123). The type of test used was a tensile test for films and coatings, ASTM test method D 882, capable of calculating the Young's modulus, tensile strength, yield strength, percent elongation and tensile toughness. The tensile toughness is the area of the stress-strain curve when the sample is strained to the breaking point. The results are indicated on Table 3. The Young's modulus is the ratio of the tensile stress to the strain in the linear portion of the stress-strain curve. The result is expressed in force per unit area usually gigapascals (GPa) or pounds per square inch (psi). The tensile strength is calculated by dividing the load at breaking point by the original cross-sectional area of the test specimen. The result is expressed in force per unit area usually megapascals (MPa) or pounds per square inch (psi). The yield strength is calculated by dividing the load at the yield point by the original cross-sectional area of the test specimen. The result is expressed in force per unit area, usually megapascals (MPa) or pounds-force per square inch (psi). The percentage elongation at break is calculated by dividing the elongation at the moment of rupture of the test specimen by the initial gauge length of the specimen and multiplying by 100. The tensile toughness is the total energy absorbed per unit volume of the specimen up to the point of rupture. The result is expressed in units of Joules cm-3.

The results depicted in Table 3 indicate an improvement in the mechanical properties of the polyesters prepared according to the present invention. Specifically, the results indicate a substantial improvement in the tensile toughness over a conventional polycarbonate binder used in the fabrication of imaging members.

TABLE 3

| Polymer | Young's Modulus GPa | Tensile Strength MPa | Yield Strength MPa | Percent Elongation | Tensile Toughness Joules/cm$^3$ |
|---|---|---|---|---|---|
| PC(Z) | 4.04 | 87.26 | 87.0 | 2.75 | 1.34 |
| Ex. 1 Polyester | 3.72 | 146.9 | 64.6 | 76.4 | 80.3 |
| Ex. 2 Polyester | 3.64 | 146.6 | 64.8 | 77.4 | 82.0 |

While the invention has been described with reference to specific embodiments, it will be apparent to those skilled in the art that many alternatives, modifications and variations may be made. Accordingly, the present invention is intended to embrace all such alternatives, modifications and variations that may fall within the spirit and scope of the appended claims and equivalents thereof.

What Is claimed:

1. A copolyester of the formula

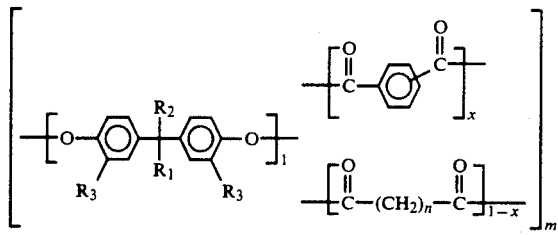

wherein $R_1$, $R_2$, and $R_3$ are independently selected from the group consisting of alkyl and aryl, m and n are numbers greater than zero, and x is a number from about 0.4 to about 0.6.

2. A copolyester according to claim 1 wherein m is a number of from about 4 to about 1000 and corresponds to the degrees of polymerization of the polymer.

3. A copolyester according to claim 1 where in $R_1$ and $R_2$ are selected from the group consisting of methyl, ethyl, phenyl, benzyl, napthyl, cyclohexyl, t-butylcyclohexyl, phenylcyclohexyl, and cycloheptyl.

4. A copolyester according to claim 1 wherein $R_3$ is methyl or hydrogen.

5. A copolyester according to claim 1 having a weight average molecular weight of from about 15,000 to about 150,000.

6. A copolyester according to claim 5 having a weight average molecular weight of from about 30,000 to about 100,000.

7. A copolyester according to claim 1 having a Mw/Mn ratio of from about 2.1 to about 4.0.

8. A copolyester according to claim 7 having a Mw/Mn ratio of from about to 2.1 about 2.8.

9. A copolyester of claim 1 selected from the group consisting of poly[(4,4'-cyclohexylidenebisphenol)-alt-(terephthalic acid; sebacic acid)], poly[(4,4'-cyclohexylidenebisphenol)-alt-(terephthalic acid; azelaic acid)], poly[(4,4'-cyclohexylidenebisphenol)-alt-(terephthalic acid; suberic acid)], poly[(4,4'-cyclohexylidenebisphenol)-alt-(isophthalic acid; sebacic acid], poly[(4,4'-cyclohexylidenebisphenol)-alt-(isophthalic acid; azelaic acid)], poly[(4,4'-(1-phenylethylidene)bisphenol)-alt-(isophthalic acid; suberic acid)], poly[(4,4'-(1-phenylethylidene)bisphenol)-alt-(terephthalic acid; sebacic acid)], poly[(4,4'-(1-phenylethylidene)bisphenol)-alt-(terephthalic acid; azelaic acid)], poly[(4,4'-(1-phenylethylidene)bisphenol)-alt-(terephthalic acid; suberic acid)], poly[(4,4'-(1-phenylethylidene)bisphenol)-alt-(isophthalic acid; sebacic acid)], poly[(4,4'-(1-phenylethylidene)bisphenol)-alt-(isophthalic acid; azelaic acid)], poly[(4,4,-(1-phenylethylidene)bisphenol)-alt-(isophthalic acid; suberic acid)], poly[(4,4'-cyclohexylidene-2,2'-dimethylbisphenol)-alt-(terephthalic acid; sebacic acid)], poly[(4,4'-cyclohexylidene-2,2'-dimethylbisphenol)-alt-(terephthalic acid; azelaic acid)], poly[(4,4'-cyclohexylidene-2,2'-dimethylbisphenol)-alt-(terephthalic acid; suberic acid)], poly[(4,4'-cyclohexylidene-2,2'-dimethylbisphenol)-alt-(isophthalic acid; sebacic acid)], poly[(4,4'-cyclohexylidene-2,2'-dimethylbisphenol)-alt-(isophthalic acid; azelaic acid)], poly[(4,4'-(4-t-butylcyclohexylidene)bisphenol)-alt-(terephthalic acid; sebacic acid)], poly[(4,4'-(4-t -butylcyclohexylidene)bisphenol)-alt-terephthalic acid; azelaic acid)], poly[(4,4'-(4-t-butylcyclohexylidene)bisphenol)-alt-terephthalic acid; suberic acid)], poly[(4,4'-(4-t -butylcyclohexylidene)bisphenol)-alt-(isophthalic acid; sebacic acid)], poly[)4,4'-(4-t-butylcyclohexylidene)bisphenol)-alt -(isophthalic acid; azelaic acid)], poly[(4,4'-isopropylidenebisphenol)-alt-(terephthalic acid; sebacic acid)], poly[(4,4'-isopropylidenebisphenol)-alt-(terephthalic acid; azelaic acid)], poly[(4,4'-isopropylidenebisphenol)-alt-(terephthalic acid; suberic acid)], poly[(4,4'-iospropylidenebisphenol)-alt-(isophthalic acid; sebacic acid)], poly[(4,4'-iospropylidenebisphenol)-alt-(isophthalic acid; azelaic acid)], poly[(4,4'-cycloheptylidenebisphenol) -alt-(terephthalic acid; sebacic acid)], poly[(4,4'-cycloheptylidenebisphenol)-alt-(terephthalic acid; azelaic acid)], poly[(4,4'-cycloheptylidenebisphenol)-alt-(terephthalic acid; suberic acid)], poly[(4,4'-cycloheptylidenebisphenol)-alt-(isophthalic acid; sebacic acid)], poly[(4,4'-cycloheptylidenebisphenol)-alt-(isophthalic acid; azelaic acid)], poly[(4,4'-isopropylidene-2,2'-dimethylbisphenol)-alt-(terephthalic acid; sebacic acid)], poly[(4,4'-isopropylidene-2,2'-dimethylbisphenol)-alt-(terephthalic acid; azelaic acid)], poly[(4,4'-isopropylidene-2,2'-dimethylbisphenol)-alt-(terephthalic acid; suberic acid)], poly[(4,4'-isopropylidene-2,2'-dimethylbisphenol)-alt-(isophthalic acid; sebacic acid)], poly[(4,4'-isopropylidene-2,2'-dimethylbisphenol)-alt-(isophthalic acid; azelaic acid)], poly[(4,4'-diphenylmethylidenebisphenol)-alt-(terephthalic acid; sebacic acid)], poly[(4,4'-diphenylmethylidenebisphenol)-alt-(terephthalic acid; azelaic acid)], poly[(4,4'-diphenylmethylidenebisphenol)-alt-(terephthalic acid; suberic acid)], poly[(4,4'-diphenylmethylidenebisphenol)-alt-(isophthalic acid; sebacic acid)], poly[(4,4'-diphenylmethylidenebisphenol)-alt-(isophthalic acid; azelaic acid)], poly[(4,4'-(1,4-phenylenebisisopropylidene)bisphenol)-alt-(terephthalic acid; sebacic acid)], poly[(4,4'-(1,4-phenylenebisisopropylidene)bisphenol)-alt-(terephthalic acid; azelaic acid)], poly[(4,4'-(1,4-phenylenebisisopropylidene)bisphenol)-alt-(terephthalic acid; suberic acid)], poly[(4,4'-(1,4-phenylenebisisopropylidene)bisphenol)-alt-(isophthalic acid; sebacic acid)], poly[(4,4'-(1,4-phenylenebisisopropylidene)bisphenol)-alt-(isophthalic acid; azelaic acid)], poly[(4,4'-(1,3-phenylenebisisopropylidene)bisphenol)-alt-(terephthalic acid; sebacic acid)], poly[(4,4'-(1,3-phenylenebisisopropylidene)bisphenol)-alt-(terephthalic acid; azelaic acid)], poly[(4,4'-(1,3-phenylenebisisopropylidene)bisphenol)-alt-(terephthalic acid; suberic acid)], poly[(4,4'-(1,3-phenylenebisisopropylidene)bisphenol)-alt-(isophthalic acid; sebacic acid)], poly[(4,4'-(1,3-phenylenebisisopropylidene)bisphenol)-alt-(isophthalic acid; azelaic acid)], poly[(4,4'-cyclohexylidene-2,2'-dichlorobisphenol)-alt-(terephthalic acid; sebacic acid)], poly[(4,4'-cyclohexylidene-2,2'-dichlorobisphenol)-alt-(terephthalic acid; azelaic acid)], poly[(4,4'-cyclohexylidene-2,2'-dichlorobisphenol)-alt-(terephthalic acid; suberic acid)], poly[(4,4'-cyclohexylidene-2,2'-dichlorobisphenol)-alt-(isophthalic acid; sebacic acid)], poly[(4,4'-cyclohexylidene-2,2'-dichlorobisphenol)-alt-(isophthalic acid; azelaic acid)], poly[(4,4'-cyclohexylidene-2,2'-dichlorobisphenol)-alt-(terephthalic acid; glutaric acid)], poly[(4,4'-(1,4-phenylenebisisopropylidene)bisphenol)-alt-(terephthalic acid; azelaic acid)], poly[(4,4'-isopropylidenebisphenol)-alt-(isophthalic acid; adipic acid)], poly[(4,4'-cyclohexylidene-2,2'-dimethylbisphenol)-alt-(terephthalic acid; pimelic acid)], poly[(4,4'-cyclohexylidenebisphenol)-alt-(terephthalic acid; brassylic acid)], poly[(4,4'-cyclohexylidene-2,2'-dichlorobisphenol)-alt-(terephthalic acid; malonic acid)], poly[(4,4'-(1,4-phenylenebisisopropylidene)bisphenol)-alt-(terephthalic acid; 1,4-cyclohexanedicarboxylic acid)], poly[(4,4'-isopropylidenebisphenol)-alt-(isophthalic acid; 3,3-dimethylglutaric acid)], poly[(4,4'-cyclohexylidene-2,2'-dimethylbisphenol)-alt-(terephthalic acid; succinic acid] and poly[(4,4'-cyclohexylidenebisphenol)-alt-(terephthalic acid; 2,3-dibromosuccinic acid)].

10. A copolyester of claim 1 selected from the group consisting of poly[(4,4'-cyclohexylidenebisphenol)-alt-(terephthalic acid; isophthalic acid; sebacic acid)], poly[(4,4'-cyclohexylidenebisphenol)-alt-(terephthalic acid; isophthalic acid; azelaic acid)] and poly[(4,4'-cyclohexylidenebisphenol)-alt-(terephthalic acid; isophthalic acid; suberic acid)].

11. A copolyester of claim 1 selected from the group consisting of poly[(4,4'-cyclohexylidenebisphenol)-alt-(terephthalic acid; azelaic acid; sebacic acid)], poly[(4,4'-cyclohexylidenebisphenol)-alt-(terephthalic acid; succinic acid; glutaric acid)] and poly[(4,4'-cyclohexylidenebisphenol)-alt-(terephthalic acid; 1,4-cyclohexanedicarboxylic acid; suberic acid)].

12. A copolyester of claim 1 selected from the group consisting of poly[(4,4'-cyclohexylidene-2,2'-dichlorobisphenol; 4,4'-isopropylidenebisphenol)-alt-(terephthalic acid; sebacic acid)], poly[(4,4'-cyclohexylidenebisphenol; 4,4'-cyclohexylidene-2,2'-dimethylbisphenol)-alt-(terephthalic acid; sebacic acid)], poly[(4,4'-isopropylidene-2,2'-dimethylbisphenol; 4,4'-cyclohexylidene-2,2'-dimethylbisphenol)-alt-(terephthalic acid; sebacic acid)], and poly[(4,4'-cyclohexylidenebisphenol] 4,4'-(1,4-phenylenebisisopropylidene)bisphenol)-alt-(terephthalic acid; sebacic acid)].

13. A bisphenol-based polyester of the formula:

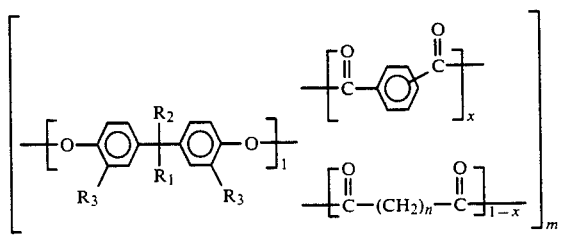

wherein $R_1$, $R_2$ and $R_3$ are independently selected from the group consisting of alkyl and aryl, m and n are numbers greater than zero, and x is a number from about 0.4 to about 0.6 said process comprising the steps of:

a) diacetylizing at least one bisphenol of the formula above; and b) polymerizing the product obtained from step (a) with at least one aromatic acid of the formula above and at least one aliphatic diacid of the formula above.

14. The polyester according to claim 13 wherein the bisphenol is selected from the group consisting of (4,4'-cyclohexylidenebisphenol), (4,4'-(1-phenylethylidene)-bisphenol), (4,4'-cyclohexylidene-2,2'-dimethylbisphenol), (4,4'-(4-t-butylcyclohexylidene)bisphenol), (4,4'-isopropylidenebisphenol), (4,4'-cycloheptylidenebisphenol), (4,4'-isopropylidene-2,2'-dimethylbisphenol), (4,4'-diphenylmethylidenebisphenol), (4,4'-(1,4-phenylenebisisopropylidene)bisphenol), (4,4'-(1,3-phenylenebisisopropylidene)bisphenol), (4,4'-cyclohexylidene-2,2'-dichlorobisphenol), and (4,4'-(1,4-phenylenebisisopropylidene)bisphenol).

15. The polyester according to claim 14 wherein the bisphenol is 4,4'-cyclohexylidenebisphenol.

16. The polyester according to claim 13 wherein the bisphenol is 4,4'-(1-phenylethylidene)bisphenol.

17. The polyester according to claim 13 wherein the aromatic diacid is selected from the group consisting of isophthalic acid, phthalic acid and terephthalic acid.

18. The polyester according to claim 17 wherein the aromatic diacid is terephthalic acid.

19. The polyester according to claim 13 wherein the aliphatic diacid is of the formula $HO_2C(CH_2)_nCO_2H$ wherein n is from 2-9.

20. The polyester of claim 19 wherein the aliphatic diacid is selected from the group consisting of sebacic acid, azelaic acid and suberic acid.

21. The polyester of claim 20 wherein the aliphatic diacid is sebacic acid.

22. The polyester of claim 19 wherein n is from 4 to 9.

23. A charge transport layer for an organic photoreceptor comprising a bisphenol-based polyester of claim 1 or 12.

24. An organic photoreceptor comprising at least one layer which comprises a bisphenol-based polyester made according to claim 1 or 12.

25. A polymer formed from the polycondensation of at least one bisphenol and a mixture of at least one aliphatic diacid of the formula $HO_2C(CH_2)_nCO_2H$ wherein n is an integer and at least one aromatic diacid, the ratio of the acid mixture to bisphenol/diacetate being about 1 to 1, and the ratio the aliphatic diacids to the aromatic diacids in said mixture being from about 60:40 to about 40:60.

26. A polymer according to claim 25 wherein n is from 2–9.

27. A polymer according to claim 26 wherein n is from 4–9.

28. A photoreceptor matrix formed from the polymer according to claim 25.

29. A photoreceptor matrix comprising a polymer formed by the polycondensation of a diacetate of at least one bisphenol selected from the group consisting of (4,4'-cyclohexylidenebisphenol), (4,4'-(1-phenylethylidene)bisphenol), (4,4'-cyclohexylidene-2,2'-dimethylbisphenol, (4,4'-(4-t-butylcyclohexylidene)bisphenol), (4,4'-isopropylidenebisphenol), (4,4'-cycloheptylidenebisphenol), (4,4'-isopropylidene-2,2-dimethylbisphenol), (4,4'-diphenylmethylidenebisphenol), (4,4'-(1,4-phenylenebisisopropylidene) bisphenol), (4,4'-(1,3-phenylenebisisopropylidene)bisphenol), (4,4'-cyclohexylidene-2,2'-dichlorobisphenol), and (4,4'-(1,4-phenylenebisisopropylidene)bisphenol), a mixture of at least one aromatic diacid selected from the group consisting of terephthalic isophthalic or phthalic, and at least one aliphatic diacid of the formula $HO_2C(CH_2)_nCO_2H$ wherein n is an integer, wherein the ratio the aliphatic diacids tot he aromatic diacids in said mixture being from about 60:40 to about 40:60.

30. The photoreceptor matrix according to claim 29 wherein n is from 2–9.

31. The photoreceptor matrix according to claim 30 wherein n is from 4–9.

32. A copolyester according to claim 1 wherein x is about 0.5.

33. A bisphenol-based polyester according to claim 52 wherein x is about 0.5.

34. A polymer according to claim 25 wherein said ratio is about 50:50.

* * * * *

UNITED STATES PATENT AND TRADEMARK OFFICE
CERTIFICATE OF CORRECTION

PATENT NO. : 5,162,485  Page 1 of 2
DATED : November 10, 1992
INVENTOR(S) : Peter G. Odell, et al It is certified that error appears in the above-indentified patent and that said Letters Patent is hereby corrected as shown below:

| Column | Line | |
|---|---|---|
| 4 | 15 | Change "amines" to --amine--. |
| 4 | 53 | Change "includes" to --include--. |
| 7 | 33 | Change "dipehmylmethylidenebisphenol)" to --diphenylmethylidenebisphenol)--. |
| 10 | 6 | Change "is" to --are--. |
| 12 | 53 | Change "millileter" to --milliliter--. |
| 13 | 16 | Change "an" to --and--. |
| 16 | 23 | Change "acid]," to --acid)],--. |
| 16 | 34 | Change "poly[(4,4,-..." to --poly[(4,4'-...--. |
| 16 | 50 | Change "poly[)4,4'-..." to --poly[(4,4'-...-- |
| 19 | 14 | After "ratio" insert --of--. |

UNITED STATES PATENT AND TRADEMARK OFFICE
CERTIFICATE OF CORRECTION

PATENT NO. : 5,162,485
DATED : November 10, 1992
INVENTOR(S) : Peter G. Odell, et al It is certified that error appears in the above-indentified patent and that said Letters Patent is hereby corrected as shown below:

| Column | Line | |
|---|---|---|
| 20 | 4 | Change "...-2,2-..." to --...-2,2'-...--. |
| 20 | 11 | After "terephthalic" insert --,--. |
| 20 | 12 | Change "$HO_2C(CH_2)-$" to -- $HO_2C(CH_2)_n-$ --. |
| 20 | 13 | Change "$_nCO_2H$" to --$CO_2H$--. |
| 20 | 14 | Change "tot he" to --to the--. |
| 20 | 23 | Change "52" to --13--. |

Signed and Sealed this

Ninth Day of November, 1993

BRUCE LEHMAN

Attest:

Attesting Officer

Commissioner of Patents and Trademarks